United States Patent
Chen et al.

(10) Patent No.: US 11,544,621 B2
(45) Date of Patent: Jan. 3, 2023

(54) COGNITIVE MODEL TUNING WITH RICH DEEP LEARNING KNOWLEDGE

(71) Applicant: International Business Machines Corporation, Armonk, NY (US)

(72) Inventors: Hanging Chen, San Jose, CA (US); Abhinandan Kelgere Ramesh, San Jose, CA (US); Sundari Voruganti, San Jose, CA (US); Ramani Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 16/364,536

(22) Filed: Mar. 26, 2019

(65) Prior Publication Data
US 2020/0311595 A1 Oct. 1, 2020

(51) Int. Cl.
*G06N 20/00* (2019.01)
*G06F 16/22* (2019.01)
*G06N 5/02* (2006.01)

(52) U.S. Cl.
CPC ............. *G06N 20/00* (2019.01); *G06F 16/22* (2019.01); *G06N 5/02* (2013.01)

(58) Field of Classification Search
CPC ........... G06N 20/00; G06N 5/02; G06F 16/22
USPC .......................................................... 706/12
See application file for complete search history.

(56) References Cited

U.S. PATENT DOCUMENTS

| | | | |
|---|---|---|---|
| 9,135,559 B1 * | 9/2015 | Chan ...................... | G06N 5/022 |
| 9,996,804 B2 * | 6/2018 | Bowers .................. | G06N 20/00 |
| 10,318,874 B1 * | 6/2019 | Duncan .................. | G06N 20/20 |
| 11,132,602 B1 * | 9/2021 | Xie ..................... | G06F 16/90324 |
| 11,373,632 B2 * | 6/2022 | Galitsky ................ | G10L 13/00 |
| 2009/0265290 A1 * | 10/2009 | Ciaramita ................ | G06N 3/08 706/12 |

(Continued)

OTHER PUBLICATIONS

Liu, F. et al., "TensorDB: Database Infrastructure for Continuous Machine Learning", Int'l Conf. Artificial Intelligence, ICAI'17, Jul. 17-20, 2017, 4 pages.

(Continued)

*Primary Examiner* — Tauqir Hussain
(74) *Attorney, Agent, or Firm* — Stephen J. Walder, Jr.; Aaron Pontikos (57) ABSTRACT

A mechanism is provided in a data processing system comprising a processor and a memory, the memory comprising instructions that are executed by the processor to configure the processor to implement a cognitive service for cognitive model tuning with rich deep learning knowledge. The mechanism performs a first model training operation and records training data set and hyperparameter information for the model in a database. The mechanism performs a model testing operation using a testing data set and records metric values that result from the model testing in the database. For a next model training operation for a given model, the mechanism performs an anomalies check for the given model. The mechanism performs a difference comparison on the training data set, hyperparameter information, and the metric values. The mechanism generates a recommendation of a training data set and hyperparameters for the next model training operation. The mechanism performs the next model training operation.

20 Claims, 8 Drawing Sheets

(56) References Cited

U.S. PATENT DOCUMENTS

| | | | | |
|---|---|---|---|---|
| 2014/0108308 | A1* | 4/2014 | Stout | G06Q 30/0241 |
| | | | | 706/20 |
| 2014/0337096 | A1* | 11/2014 | Bilenko | G06N 20/00 |
| | | | | 705/7.31 |
| 2015/0106311 | A1* | 4/2015 | Birdwell | G06N 3/08 |
| | | | | 706/26 |
| 2015/0379426 | A1* | 12/2015 | Steele | G06N 5/025 |
| | | | | 706/12 |
| 2016/0358098 | A1* | 12/2016 | Duesterwald | G06N 20/00 |
| 2016/0358101 | A1* | 12/2016 | Bowers | G06N 20/00 |
| 2016/0358103 | A1* | 12/2016 | Bowers | G06F 9/4881 |
| 2017/0017886 | A1* | 1/2017 | Gao | G06Q 30/0241 |
| 2017/0076198 | A1* | 3/2017 | Jin | G06N 3/08 |
| 2017/0124487 | A1* | 5/2017 | Szeto | G06F 11/1448 |
| 2017/0193371 | A1* | 7/2017 | Shen | G06F 16/24568 |
| 2017/0206451 | A1* | 7/2017 | Mahler | G06N 20/00 |
| 2018/0004835 | A1* | 1/2018 | Piechowicz | G06F 16/20 |
| 2018/0004859 | A1* | 1/2018 | Piechowicz | G06F 16/9024 |
| 2018/0285751 | A1* | 10/2018 | Oliva | G06Q 50/01 |
| 2018/0365560 | A1* | 12/2018 | Qiao | G06F 40/295 |
| 2019/0156933 | A1* | 5/2019 | Varshney | G16H 20/17 |
| 2020/0117718 | A1* | 4/2020 | Lundberg | G06N 3/084 |
| 2020/0119199 | A1* | 4/2020 | Yamazaki | H01L 27/1156 |
| 2020/0194310 | A1* | 6/2020 | Yamazaki | H01L 27/06 |
| 2020/0226675 | A1* | 7/2020 | Mitra | G06N 7/005 |
| 2020/0311595 | A1* | 10/2020 | Chen | G06N 5/02 |
| 2020/0334709 | A1* | 10/2020 | Ma | G06N 20/00 |
| 2021/0233641 | A1* | 7/2021 | Sasangohar | A61B 5/486 |
| 2021/0304055 | A1* | 9/2021 | Qi | G06K 9/6256 |
| 2022/0091790 | A1* | 3/2022 | Sato | G06F 3/0604 |
| 2022/0159811 | A1* | 5/2022 | Campanella | H05B 47/11 |
| 2022/0172594 | A1* | 6/2022 | Cho | G08B 21/22 |

OTHER PUBLICATIONS

Miao, Hui et al., "ModelHub: Deep Learning Lifecycle Management", 33rd International Conference on Data Engineering (ICDE), Apr. 19-22, 2017, 2 pgs.

Schelter, Sebastian et al., "Automatically Tracking Metadata and Provenance of Machine Learning Experiments", Machine Learning Systems Workshop at NIPS, 2017, Dec. 4-9, 2017, 8 pages.

Souza, Renan et al., "Towards a Human-in-the-Loop Library for Tracking Hyperparameter Tuning in Deep Learning Development", LADaS 2018—Latin America Data Science Workshop, Aug. 27, 2018, 4 pages.

Vartak, Manasi et al., "Model DB: A System for Machine Learning Model Management", Proceedings of the Workshop on Human-In-the-Loop Data Analytics, ACM, Jun. 26-Jul. 1, 2016, 3 pages.

* cited by examiner

| SERVICE NAME | PUBLISH DATE | DEV ACCURACY | SB ACCURACY | DB ACCURACY | DEV ACCURACY DETAILS | MODEL ID | 401 | 402 |
|---|---|---|---|---|---|---|---|---|
| >AE (4) | | | | | | | | |
| Seriousness | 2018-01-09T18:35:22 | 0.786 | 0.674 | 0.641 | TP=48,TN=139,FP=20,FN=31 | 8005 | DETAILS | TREND |
| MedDRA_code | 2017-10-17T15:50:02 | 0.9454987341772 | 0.98099 | 0.98056 | TP=Null,TN=Null,FP=Null,FN=Null | 5264 | DETAILS | TREND |
| Seriousness Ca | 2018-01-05T13:53:10 | 0.755 | 0.464 | 0.471 | TP=Null,TN=Null,FP=Null,FN=Null | 7816 | DETAILS | TREND |
| Outcome_Annotate | 2018-01-29T15:23:38 | 0.65497 | NeedEvaluation | ExcludeFromTest | TP=56,TN=None,FP=13,FN=46 | 8849 | DETAILS | TREND |
| > Patient (1) | | | | | | | | |
| Height_Annotation | 2018-01-25T11:53:28 | 0.72605 | ExcludeFromTest | NeedEvaluation | TP=269,TN=None,FP=102,FN=101 | 8742 | | TREND |
| > Reporter (0) | | | | | | | | |
| > Product (3) | | | | | | | | |
| ProductStartDate_A | 2018-01-23T01:30:30 | 0.67234 | NeedEvaluation | ExcludeFromTest | TP=79,TN=None,FP=24,FN=53 | 8678 | DETAILS | TREND |
| WHO_DD_code | 2017-09-08T17:25:06 | Null | 0.925 | 0.926 | TP=N/A,TN=N/A,FP=N/A,FN=N/A | 3036 | DETAILS | TREND |
| ProductStopDate_A | 2018-01-22T14:42:09 | 0.59813 | NeedEvaluation | ExcludeFromTest | TP=N/A,TN=N/A,FP=N/A,FN=N/A | 8631 | DETAILS | TREND |
| > Case (2) | | | | | | | | |
| LocalReferenceNum | 2018-01-19T18:06:00 | 0.81197 | 0.8286 | ExcludeFromTest | TP=963,TN=None,FP=224,FN=222 | 8522 | DETAILS | TREND |
| ExternalMCN_Annot | 2018-01-30T16:32:24 | 0.00025 | 0.79389 | NeedEvaluation | TP=361,TN=None,FP=64,FN=16 | 8935 | DETAILS | TREND |
| > General (3) | | | | | | | | |
| Reporter_Casualty | 2017-12-18T23:52:38 | 0.764 | NeedEvaluation | NeedEvaluation | TP=29,TN=45,FP=12,FN=7 | 7471 | DETAILS | TREND |
| ICSR | 2017-11-07T11:25:40 | 0.994 | 0.99074 | 0.99636 | TP=91,TN=85,FP=0,FN=1 | 6741 | DETAILS | TREND |
| Expectedness | 2017-10-20T18:24:46 | 0.926 | 0.87 | 0.588 | TP=Null,TN=Null,FP=Null,FN=Null | 5821 | DETAILS | TREND |

FIG. 5A

| Dev_Training_Data | Single_Blind_Data | Double_Blind_Data | Technology | ModelType | Training_Time | Environment | Trace_Files |
|---|---|---|---|---|---|---|---|
| Store_ID=/watson/ batch0-17_clad_aev/ CLAD_Instances=4554 | Store_ID=6648, CLAD_instances=1308 | Store_ID=6644, CLAD_Instances=1415 | Tensorflow/Keras | Annotation | Start=2017-12-04 19:49:36, End=2017-12-04 20:03:11 Duration(Mins)=0:13:35 | Server=N/A, GPU=N/A, CPU=N/A, Max_Memory=N/A | link |

|  | HyperParameters |
|---|---|
| char_embedding_dim | 25 |
| use_pos_embeddings | N/A |
| pretrained_char_embeddings | N/A |
| activation | relu |
| batch_size | 256 |
| use_word_embeddings | 1 |
| pretrained_word_embeddings | /watson/word_embeddings/glove_300.txt |
| number_of_lstm_cells | 100 |
| max_sen_length | 100 |
| dropout_rate | 0.5 |
| use_char_embeddings | N/A |
| max_char_in_word | 30 |
| validation_split | 0.1 |
| confidence_window_size | 2 |
| pos_embedding_dim | 10 |
| word_embedding_dim | 300 |
| optimizer | rmsprop |
| model_architecture | bi_lstm_crf |
| make_word_embedding_trainable | 1 |
| nb_epoch | 20 |
| kernel_config | N/A |
| hidden_layers_dimes | N/A |

COGNITIVE MODEL TUNING WITH RICH DEEP LEARNING KNOWLEDGE

BACKGROUND

The present application relates generally to an improved data processing apparatus and method and more specifically to mechanisms for cognitive model tuning with rich deep learning knowledge.

The process of training a machine learning (ML) model involves providing an ML algorithm (that is, the learning algorithm) with training data to learn from. The term "ML model" refers to the model artifact that is created by the training process. The training data must contain the correct answer, Which is known as a target or target attribute. The learning algorithm finds patterns in the training data that map the input data attributes to the target (the answer that you want to predict), and it outputs an ML model that captures these patterns.

In Bayesian statistics, a "hyperparameter" is a parameter of a prior distribution; the term is used to distinguish them from parameters of the model for the underlying system under analysis. For example, if one is using a beta distribution to model the distribution of the parameter p of a Bernoulli distribution, then: p is a parameter of the underlying system (Bernoulli distribution), and $\alpha$ and $\beta$ are parameters of the prior distribution (beta distribution), hence hyperparameters.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions that are executed by the processor to configure the processor to implement a cognitive service for cognitive model tuning with rich deep learning knowledge. The method comprises performing a first model training operation and recording training data set and hyperparameter information for the model in a database. The method further comprises performing a model testing operation using a testing data set and recording metric values that result from the model testing in the database, the method further comprises, for a next model training operation for a given model, performing an anomalies check for the given model. The method further comprises performing a difference comparison on the training data set, hyperparameter information, and the metric values. The method further comprises generating a recommendation of a training data set and hyperparameters for the next model training operation. The method further comprises performing the next model training operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Each developer may use different training data versions on various models to train models and may get very different performance depending on which version of the training data is used. Currently, there are no automated mechanisms for tracking what training data are being used to train different models. Moreover, there are no mechanisms that can leverage this tracking of training data, and the differences between training data, to correlate differences in performance with differences in the training data.

An illustrative embodiment provides a mechanism by which trends in training data changes may be identified and correlated to changes in accuracy of models such that recommendations may be made for improving training data. Moreover, the mechanism enables training data versioning such that one may return to a previous version of training data if needed.

In addition, an illustrative embodiment provides a tuning mechanism for tuning a model in accordance with the results obtained. An analytics engine identifies the changes in the hyperparameters, tools, and neural network used. The analytics engine determines the best combination for generating the best combination of metrics results, e.g., precision, recall, accuracy, etc. The corresponding training data sets for generating such combinations, as identified by the tracking information, may then be used to fine tune the training of the model.

An illustrative embodiment allows for improvement of training data used to train models with increased performance metrics of accuracy, precision, etc. The illustrative embodiment further permits re-creation of training data set versions from the tracked information. Moreover, the illustrative embodiment allows for fine tuning of a model to achieve a desired combination of performance metrics.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism," Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that, these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
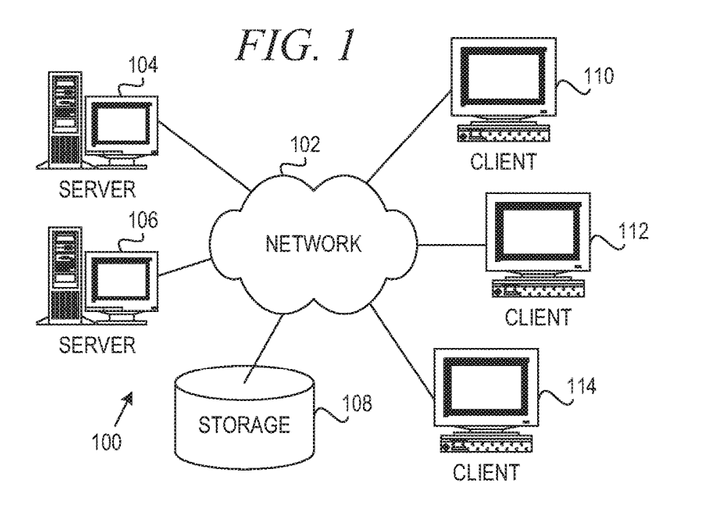
FIG. 1 is an example diagram of a distributed data processing system in which aspects of the illustrative embodiments may be implemented.
Figure 2:
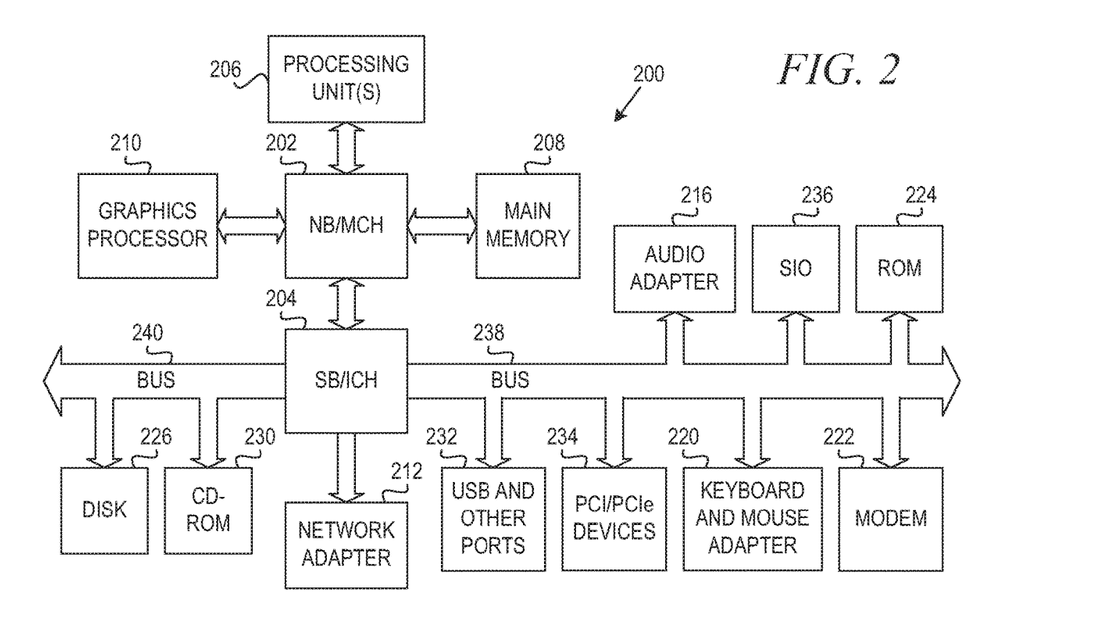
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet. Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an analytics engine for cognitive model tuning with rich deep learning knowledge. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates cognitive model tuning with rich deep learning knowledge.

As noted above, the mechanisms of the illustrative embodiments utilize specifically configured computing devices, or data processing systems, to perform the operations for cognitive model tuning. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to an analytics engine for cognitive model tuning with rich deep learning knowledge.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
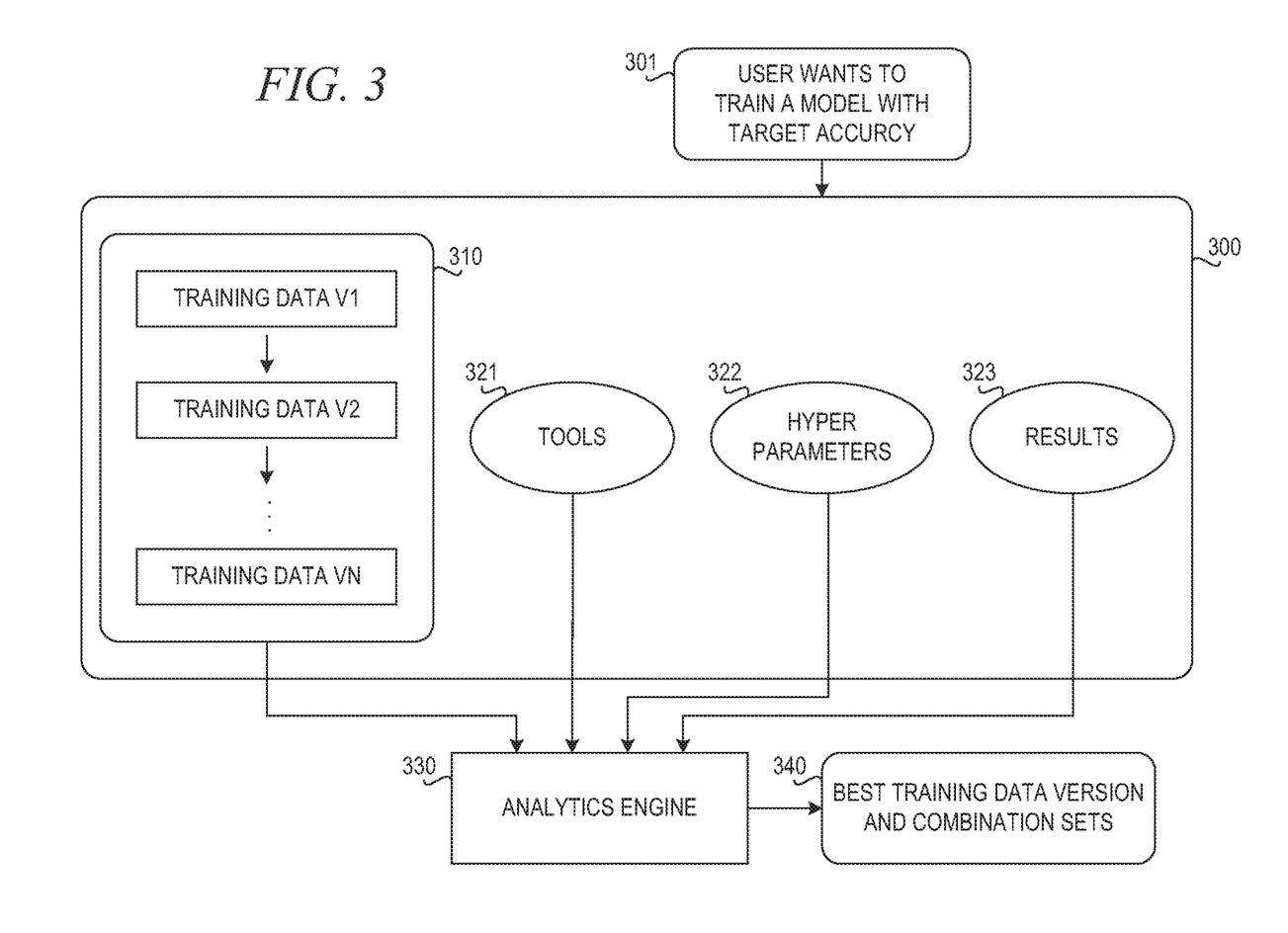
FIG. 3 is a block diagram illustrating a training pipeline and analytics engine for cognitive model tuning with rich deep learning knowledge in accordance with an illustrative embodiment.

FIG. 3 is a block diagram illustrating a training pipeline and analytics engine for cognitive model tuning with rich deep learning knowledge in accordance with an illustrative embodiment. A cognitive system comprises training pipeline 300 and analytics engine 330. Training pipeline 300 includes training data versions 310, tools 321, hyperparameters 322, and results 323. For each model training operation, the developer selects a training data set from training data versions 310, tools to use for the training from tools 321, and hyperparameters 322. In accordance with the illustrative embodiment, the training data versioning tool 310 stores training data sets or versions. The training data versions may be separate text or JavaScript Object Notation (JSON) files or may be difference files that result from comparing each current training data set to a previous training data set. Therefore, each training data version may be stored as a text difference file (Text Diff) or JavaScript Object Notation (JSON) difference file (JSON Diff). The tools 321 may include TensorFlow™, Support Vector Machine, or the like. The hyperparamters 322 may include learning rate, number of hidden layers, or the like.

Each model training operation generates a set of results 323. The results may include an accuracy score, such as an F-1 score, precision, recall, or area under the curve (AUC) score. In statistical analysis of binary classification, the F-1 score (also F-score or F-measure) is a measure of a test's accuracy. Results 323 may also include the number of false positives, the number of true positives, the number of false negatives, and the number of true negatives. Other metrics recorded in results 323 may include precision, recall.

Thus, training pipeline 330 tracks changes in the training data, tools, and hyperparameters used to train a model. Analytics engine 330 receives the training data sets 310, the tools 321, the hyperparameters 322, and the results 323 for each instance of model operation. Analytics engine 330 correlates the training data, tools, hyperparameters and results with trends, anomalies, and the like. Based on these correlations, analytics engine 330 generates recommendations 340 as to how to improve training of the model.

Various developers may use different training data versions 310, different tools 321, different hyperparameters 322, and obtain different results 323 based on such combinations. Training pipeline 300 tracks these combinations when used to train various models and determines differences between such combinations and the results generated. Analytics engine 330 determines differences in the training data that lead to better results, such as better accuracy or recall. Analytics engine 330 operates on this information to identify trends and anomalous behavior. Such operations can be performed for each of the models.

Consider the following scenario: A developer is training and learning about the operation of a model on the fly and making modifications to training data, potentially with the assistance of subject matter experts. The developer may use multiple tools, several types of hyperparameters, and may get various results. During this process, the developer determines that the ground truth is incorrect and obtains a new one, i.e., a new version of training data is obtained. Now, the developer goes back through the training process again. For each training data set, the developer may apply different tools and different hyperparameters, and may get different results. The illustrative embodiment tracks this to identify anomalies or trends.

As the developer makes changes and updates training of the model, the mechanisms of the illustrative embodiment track what was added/removed in the training data that affects the accuracy generated by the training of the model on that training data, e.g., what entities were added and what entities were deleted, Analytics on top of this can identify trends in the training data. A developer may now run new training data on a daily basis and can get updates of the accuracies of the training of the models. This may lead to identification of trends, which can be correlated with the changes in the training data. Analytics engine 330 then provides recommendations as to how to improve the training data by identifying what changes increase the accuracy of the models. For example, including more entities like X will increase the accuracy of the model. Such recommendations may then be output to the developer along with recommendations of changes not to make, i.e., changes that resulted in lower accuracy or worse performance of the model.

In addition, the illustrative embodiment provides version tracking for training data such that, if needed, previous versions of training data may be recreated. That is, a mapping of the data formatted for use by the model to the originally received training data is maintained. In this way, given the model formatted training data, the originally received training data may be recreated. Thus, the illustrative embodiment can correlate a version of training data obtained from the customer with the version of data generated for consumption of the machine, and can go back to the customer data via the tracking of the versioning so that the mechanism can reproduce an earlier version.

In addition to the above, when the model has been trained and the accuracy and other performance metrics are obtained, the model is tuned in accordance with the results obtained. An illustrative embodiment provides an analytics engine for analyzing the changes in the hyperparameters, tools, neural network used. The analytics engine determines the best combination for generating the best combination of metrics results, e.g., precision, recall, accuracy, etc. The analytics engine may focus on one parameter change at a time and then choose the best one. An illustrative embodiment may provide an automated mechanism for making individual changes and optimizing the best accuracy, precision, recall, AUC score, etc.

Figure 4:
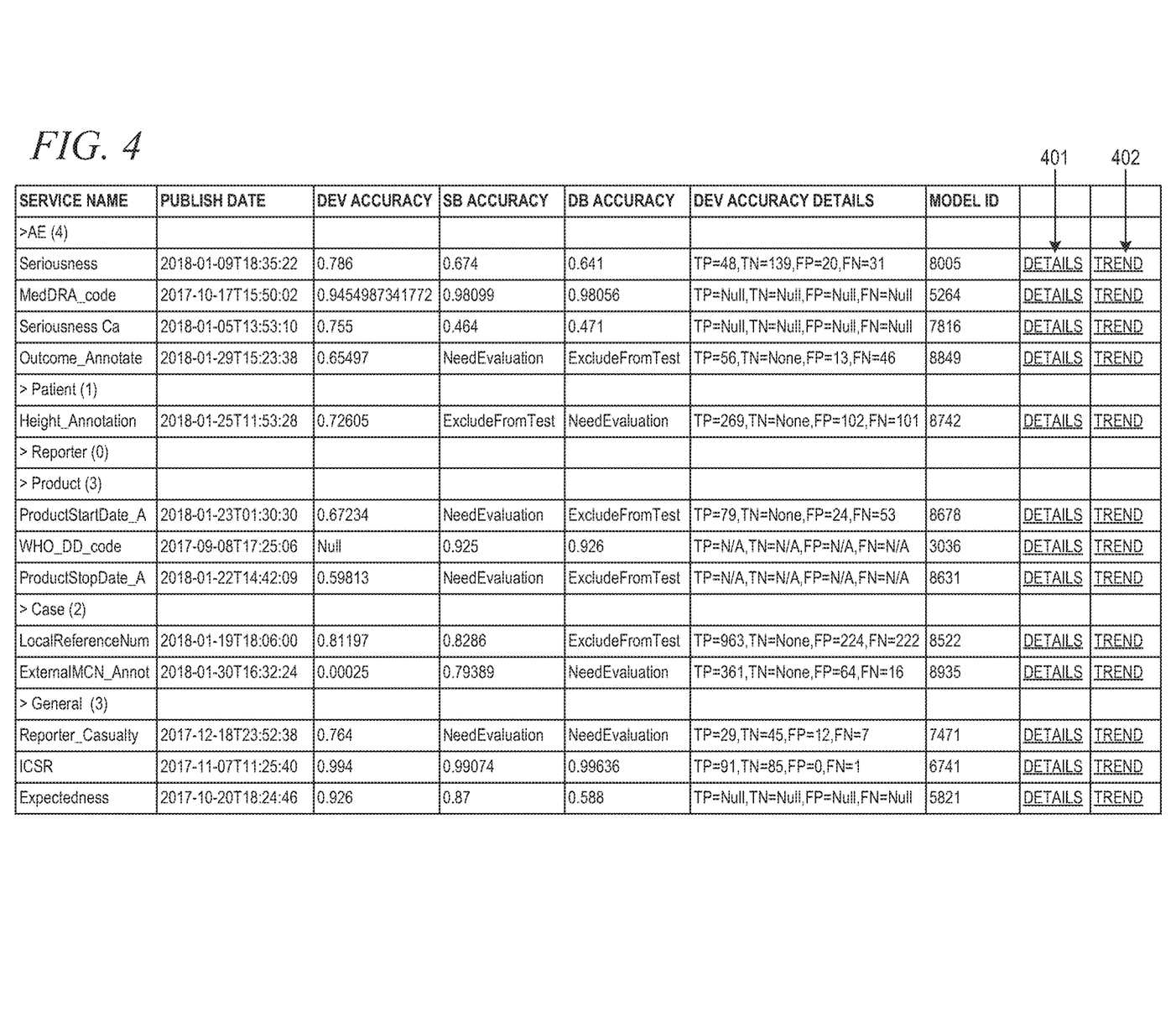
FIG. 4 depicts an example output of an analytics engine for cognitive model tuning in accordance with an illustrative embodiment.
Figure 5A:
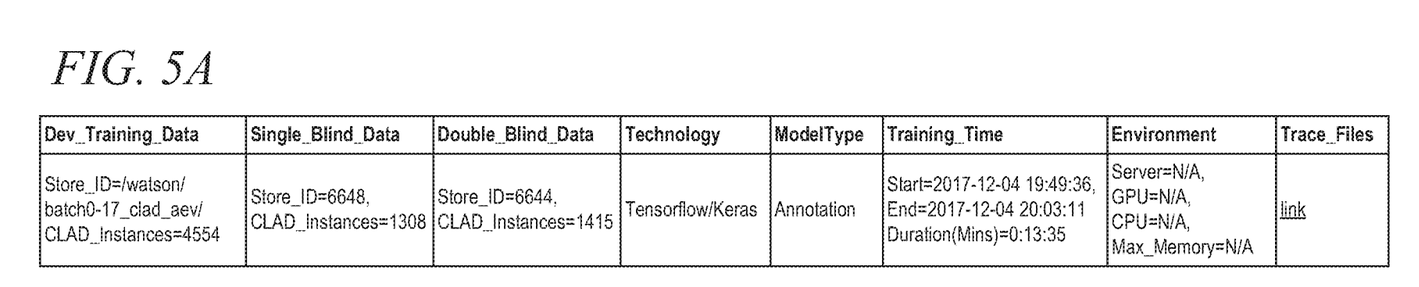
FIG. 5A depicts an example output of training data information in accordance with an illustrative embodiment.
Figure 5B:
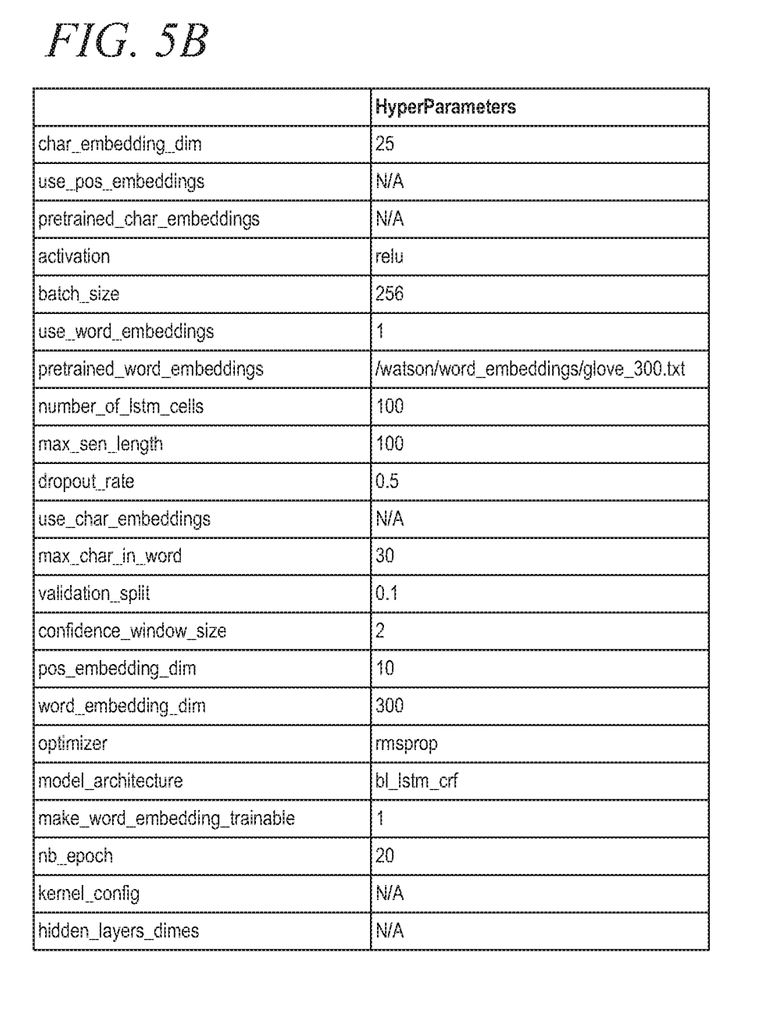
FIG. 5B depicts an example output of hyperparameters in accordance with an illustrative embodiment.

FIG. 4 depicts an example output of an analytics engine for cognitive model tuning in accordance with an illustrative embodiment. The output shown in FIG. 4 is a table that presents information for model training operations based on knowledge written into a database, Each row represents a service and a model training operation. Each row records a publish date, developer accuracy, single blind accuracy, double blind accuracy, developer accuracy details (true positives, true negatives, false positives, false negatives), and a model identification. Furthermore, each service model training operation has an associated details link 401 and trend link 402, in response to selection of details link 401, the mechanism of the illustrative embodiment presents details as shown in FIG. 5A and hyperparameters as shown in FIG. 5B. In response to selection of trend link 402, the mechanism of the illustrative embodiment presents trending information as shown in FIG. 6.

FIG. 5A depicts an example output of training data information in accordance with an illustrative embodiment. This training data information includes developer training data, single blind data, double blind data, technology, model type, training time, environment, and a link to trace files. FIG. 5B depicts an example output of hyperparameters in accordance with an illustrative embodiment. Users may locate the training data model used and compare what changes are made that contribute to accuracy change.

Figure 6:
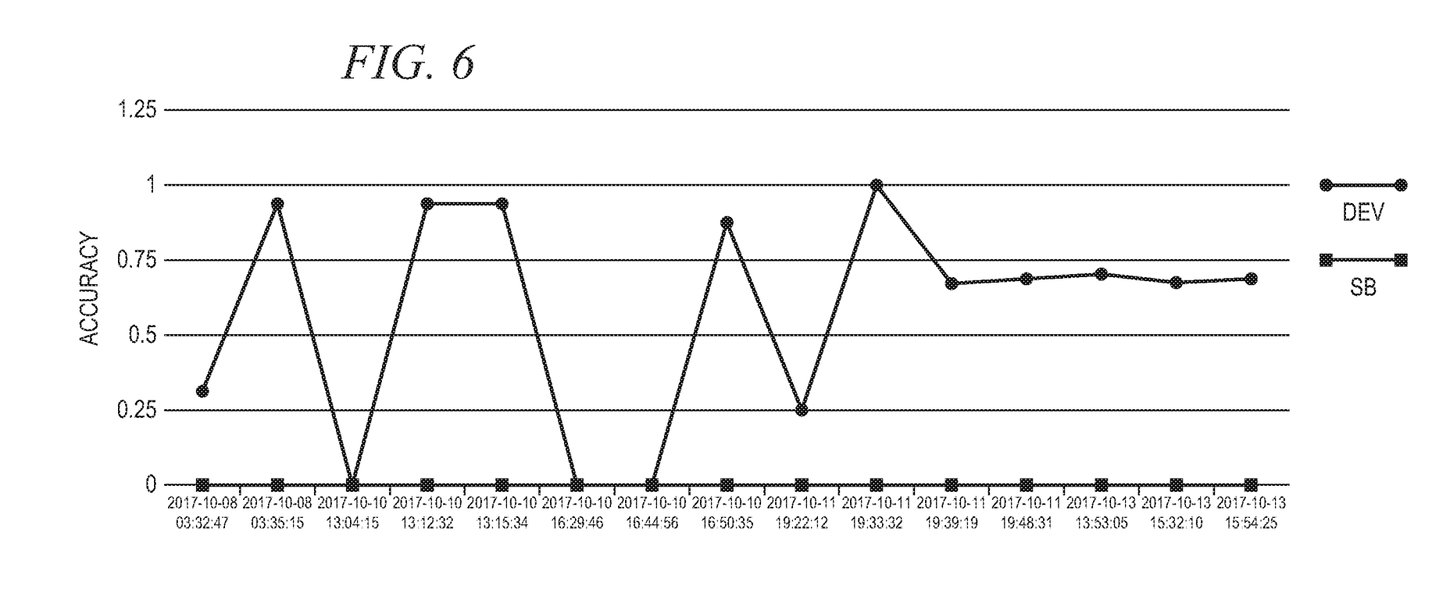
FIG. 6 depicts an example output of trending information in accordance with an illustrative embodiment.

FIG. 6 depicts an example output of trending information in accordance with an illustrative embodiment. An accuracy of zero indicates an anomaly. In response to a user clicking each data point, a mechanism of the illustrative embodiment displays the combination of training data version, tools, hyperparameters, etc. Users can easily see what combination might lead to anomalous increases or decreases in accuracy. When trending goes more smoothly with the desired accuracy, then users may identify the combination of training data version, tools, and hyperparameters from those spots.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
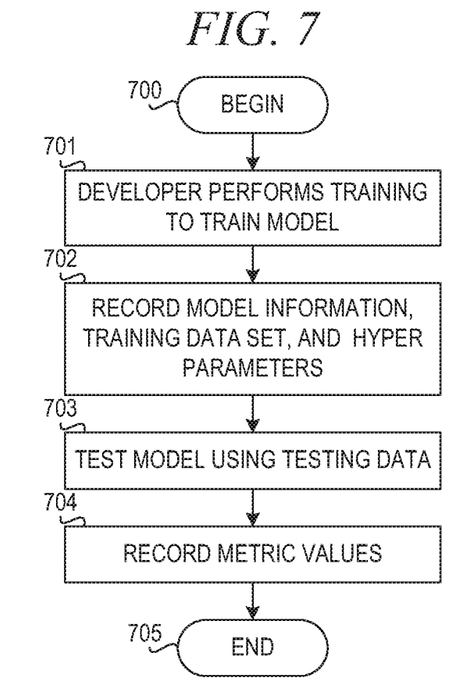
FIG. 7 is a flowchart illustrating operation of a training pipeline for tracking changes in training data, tools, hyperparemeters, and results in accordance with an illustrative embodiment.

FIG. 7 is a flowchart illustrating operation of a mechanism for tracking changes in training data, tools, hyperparemeters, and results in accordance with an illustrative embodiment. Operation begins (block 700), and the developer performs training to train a model (block 701). Operation of training a model is described in further detail below with reference to FIG. 8. The mechanism then records model information, training data set, and hyperparameters (block 702). Operation of recording information is described in further detail below with reference to FIG. 9. The mechanism tests the model using testing data (block 703). Operation of testing the model is described in further detail below with respect to FIG. 10. Then, the mechanism records metric values for results of testing the model (block 704). The metrics may include, for example, metrics for precision, recall, accuracy, etc. The metric values may include the number of true positives (TP), the number of false positives (FP), the number of true negatives (TN), and the number of false negatives (EN). Thereafter, operation ends (block 705).

Figure 8:
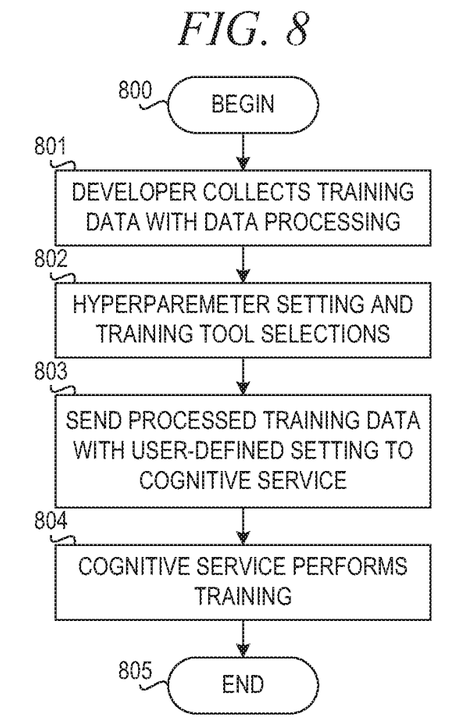
FIG. 8 is a flowchart illustrating operation of a mechanism for training a model in accordance with an illustrative embodiment.

FIG. 8 is a flowchart illustrating operation of a mechanism for training a model in accordance with an illustrative embodiment. Operation begins (block 800), and the developer collects training data with data processing (block 801). The developer performs hyperparameter settings and training tool selections (block 802). The mechanism sends the processed training data with user-defined settings to the cognitive service (block 803), and the cognitive service performs the training of the model based on the processed training data and user-defined settings (block 804). Thereafter, operation ends (block 805).

Figure 9:
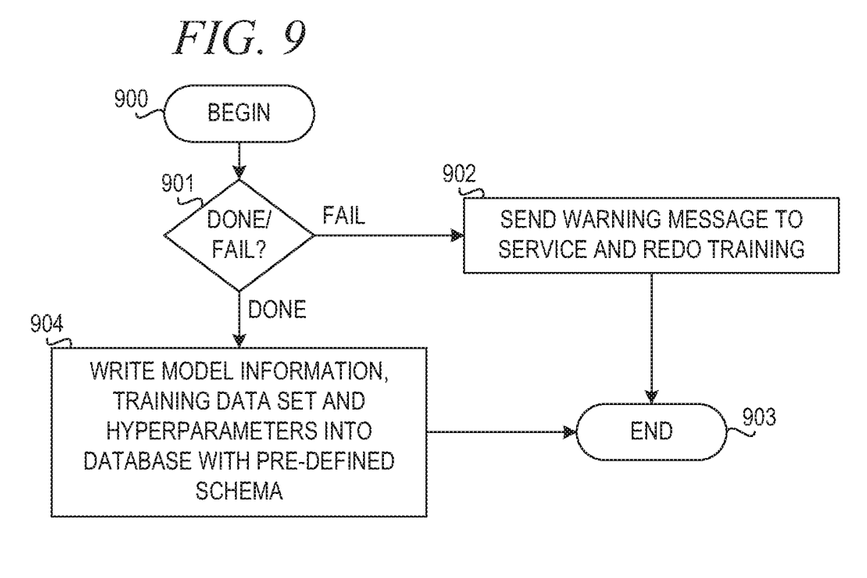
FIG. 9 is a flowchart illustrating operation of a mechanism for recording model information in accordance with an illustrative embodiment.

FIG. 9 is a flowchart illustrating operation of a mechanism for recording model information in accordance with an illustrative embodiment. Operation begins (block 900), and the mechanism determines whether the model training operations are done (block 901). Block 901 repeats until the model training completes successfully or fails if the model training operation fails, the mechanism sends a warning message to the cognitive service and redoes the training (block 902). Thereafter, operation ends (block 903).

In response to the model training completing successfully in block 901, the mechanism writes model information, training data set, and hyperparameters into a database with pre-defined schema (block 904). Thereafter, operation ends (block 903).

Figure 10:
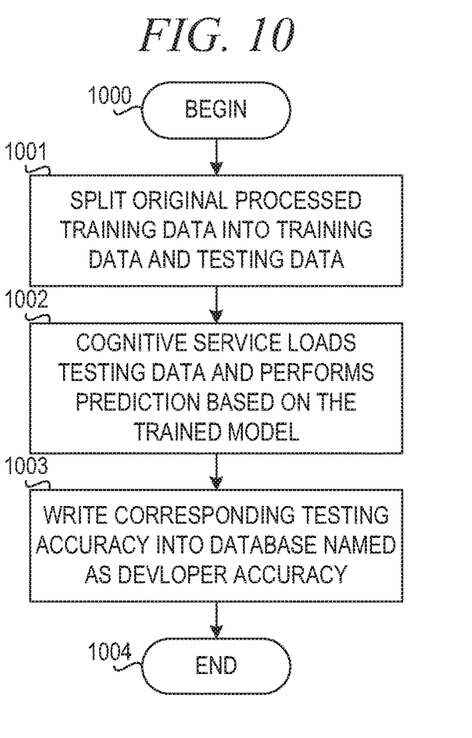
FIG. 10 is a flowchart illustrating operation of a mechanism for testing a trained model using testing data in accordance with an illustrative embodiment.

FIG. 10 is a flowchart illustrating operation of a mechanism for testing a trained model using testing data in accordance with an illustrative embodiment. Operation begins (block 1000), and the mechanism splits the original processed training data into training data and testing data with a reasonable split ratio (block 1001). The cognitive service loads testing data and performs prediction based on the trained model using the testing data once the training is done (block 1002). The mechanism then writes corresponding testing accuracy into the database named as developer accuracy (block 1003). Thereafter, operation ends (block 1004).

Figure 11:
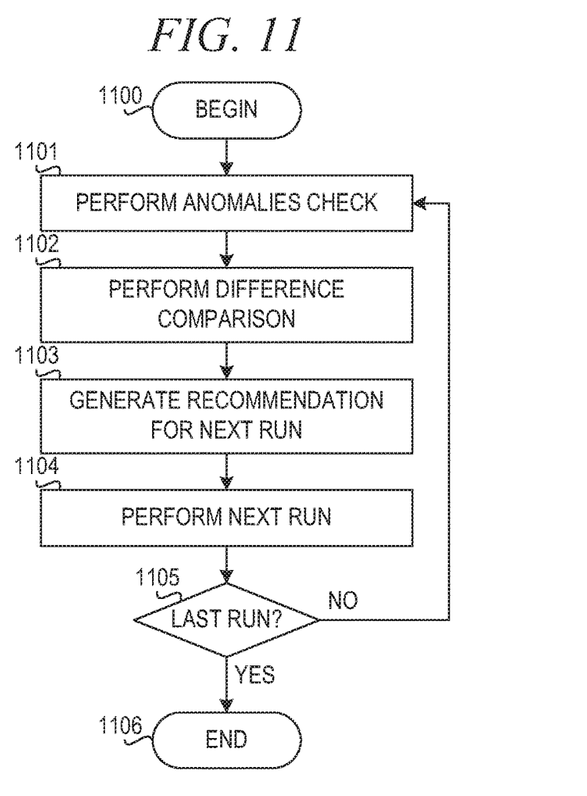
FIG. 11 is a flowchart illustrating operation of a mechanism for performing analytics for model training in accordance with an illustrative embodiment.

FIG. 11 is a flowchart illustrating operation of a mechanism for performing analytics for model training in accordance with an illustrative embodiment. Operation begins (block 1100), and the mechanism performs an anomalies check (block 1101). Operation of performing an anomalies check is described in further detail below with reference to FIG. 12. The mechanism then performs a difference comparison (block 1102). Operation of performing a difference comparison is described in further detail below with reference to FIG. 13.

Then, the mechanism generates a recommendation for a next run (block 1103). Operation of generating a recommendation for model training is described in further detail below with reference to FIG. 14. The mechanism performs the next run (block 1104), and the mechanism determines whether the run is the last run (block 1105). If the current run is not the last run, the operation returns to block 1101 to perform an anomalies check. If the current run is the last run, the operation ends (block 1106).

Figure 12:
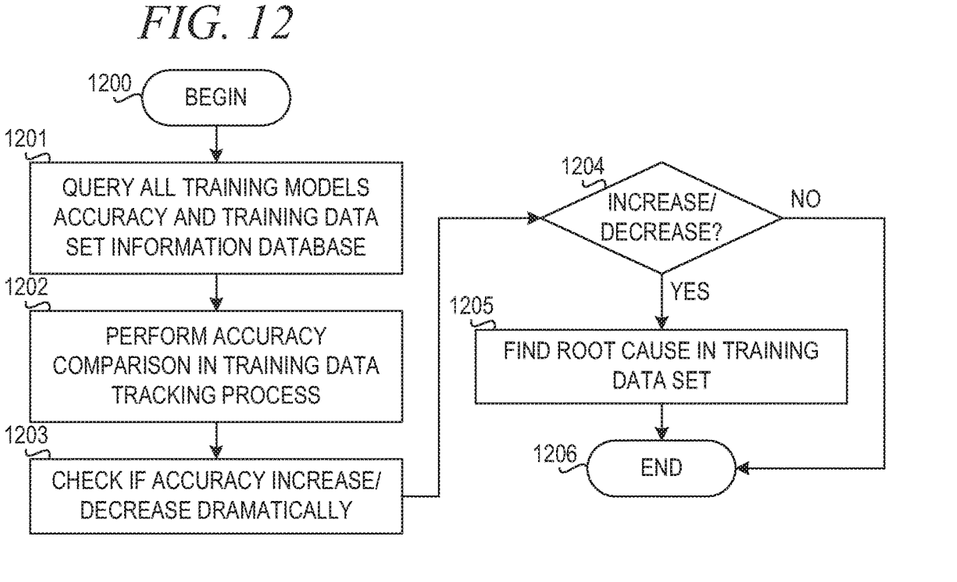
FIG. 12 is a flowchart illustrating operation of a mechanism for performing an anomalies check in accordance with an illustrative embodiment.

FIG. 12 is a flowchart illustrating operation of a mechanism for performing an anomalies check in accordance with an illustrative embodiment. Operation begins (block 1200), and the mechanism queries all training models accuracy and training data set information in the database (block 1201). The mechanism performs an accuracy comparison in training data tracking process (block 1202). The tuning procedure will perform various trials by adding/removing/modifying training data to detect whether anomalies will occur then; the mechanism checks if the accuracy increases or decreases dramatically (block 1203). In one embodiment, to determine whether an increase or decrease is dramatic, the mechanism may set a threshold (e.g., 0.2) of decrease or increase percentage. If the accuracy decrease or increase is over 20% after the change, the mechanism may mark this as a "dramatic" change. The mechanism determines whether the increase or decrease represents an anomaly (block 1204). If the increase or decrease represents an anomaly, then the mechanism finds the root cause in the training data set (block 1205). Thereafter, operation ends (block 1206). If the increase or decrease does not represent an anomaly in block 1204, then operation ends (block 1206).

Figure 13:
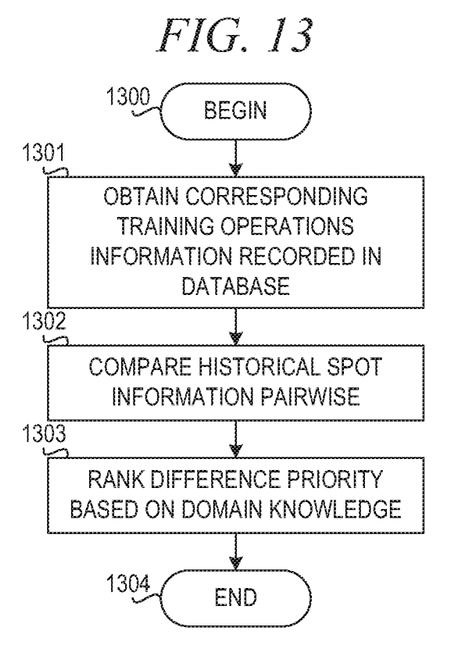
FIG. 13 is a flowchart illustrating operation of a mechanism for performing a difference comparison in accordance with an illustrative embodiment.

FIG. 13 is a flowchart illustrating operation of a mechanism for performing a difference comparison in accordance with an illustrative embodiment. Operation begins (block 1300), and the mechanism obtains corresponding training operations information recorded in the database (block 1301). The mechanism compares historical spot information pairwise (block 1302). The mechanism then ranks the difference priority on domain knowledge (block 1303). Thereafter, operation ends (block 1304).

Figure 14:
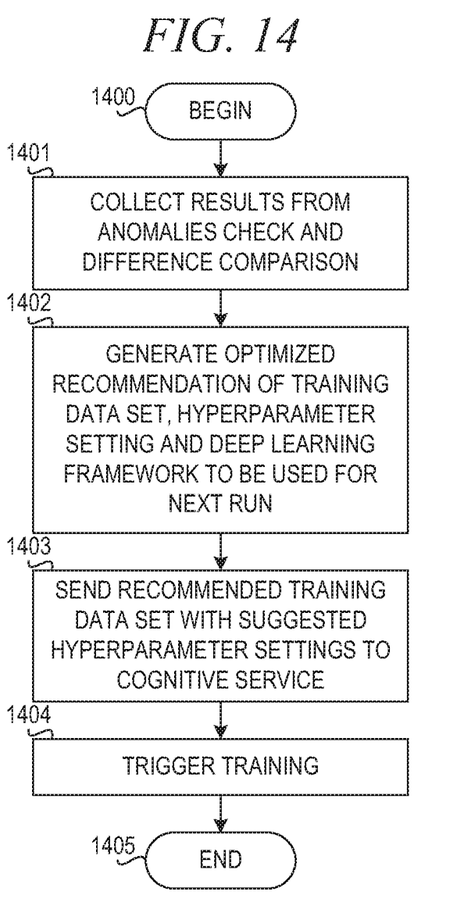
FIG. 14 is a flowchart illustrating operation of a mechanism for generating a recommendation in accordance with an illustrative embodiment.

FIG. 14 is a flowchart illustrating operation of a mechanism for generating a recommendation in accordance with an illustrative embodiment. Operation begins (block 1400), and the mechanism collects results from the anomalies check and the difference comparison (block 1401). The mechanism generates optimized recommendation of training data set, hyperparameter setting, and deep learning framework to be used for the next run (block 1402). The mechanism then sends recommended training data set with suggested hyperparameter settings to the cognitive service (block 1403) and triggers training of the model (block 1404). Thereafter, operation ends (block 1405).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to configure the processor to implement a cognitive service for cognitive model tuning with rich deep learning knowledge, the method comprising:

collecting and storing, in a database, for each model of a plurality of trained machine learning computer models, training data set characteristic information and hyperparameter information, wherein at least two of the trained machine learning computer models are trained using different training data sets having different training data set characteristic information;

performing a model testing operation on each model of the plurality of trained machine learning computer models, using a testing data set and recording performance metric values that result from the model testing, in the database in association with the training data set characteristic information and hyperparameter information for each model;

performing a difference comparison on the training data set characteristic information, hyperparameter information, and the performance metric values associated with each model of the plurality of trained machine learning computer models, to thereby generate a trend data structure that correlates differences in training data set characteristic information and hyperparameter information with differences in performance metric values to thereby specify a trend;

generating a recommendation of a training data set and hyperparameters, based on the trend specified in the trend data structure, for training a new machine learning computer model; and performing the recommended machine learning training operation to generate a new trained machine learning computer model.

2. The method of claim 1, further comprising, for each model of the plurality of trained machine learning computer models, responsive to the model testing operation completing successfully, writing model information, training data set, and hyperparameters into the database with a predefined schema, to thereby collect and store the training data set characteristic information and hyperparameter information for the model in the database.

3. A computer program product comprising a computer readable storage medium having a computer readable program stored therein, wherein the computer readable program, when executed on a computing device, causes the computing device to implement a cognitive service for cognitive model tuning with rich deep learning knowledge:

collecting and storing, in a database, for each model of a plurality of trained machine learning computer models, training data set characteristic information and hyperparameter information, wherein at least two of the trained machine learning computer models are trained using different training data sets having different training data set characteristic information;

perform a model testing operation on each model of the plurality of trained machine learning computer models, using a testing data set and recording performance metric values that result from the model testing, in the database in association with the training data set characteristic information and hyperparameter information for each model;

perform a difference comparison on the training data set characteristic information, hyperparameter information, and the performance metric values associated with each model of the plurality of trained machine learning computer models, to thereby generate a trend data structure that correlates differences in training data set characteristic information and hyperparameter information with differences in performance metric values to thereby specify a trend;

generate a recommendation of a training data set and hyperparameters, based on the trend specified in the trend data structure, for training a new machine learning computer model; and perform the recommended machine learning training operation to generate a new trained machine learning computer model.

4. The computer program product of claim 3, further comprising, for each model of the plurality of trained machine learning computer models, responsive to the model testing operation completing successfully, writing model information, training data set, and hyperparameters into the database with a pre-defined schema, to thereby collect and store the training data set characteristic information and hyperparameter information for the model in the database.

5. An apparatus comprising:
a processor; and
a memory coupled to the processor, wherein the memory comprises instructions which, when executed by the processor, cause the processor to implement a cognitive service for cognitive model tuning with rich deep learning knowledge:

collecting and storing, in a database, for each model of a plurality of trained machine learning computer models, training data set characteristic information and hyperparameter information, wherein at least two of the trained machine learning computer models are trained using different training data sets having different training data set characteristic information;

perform a model testing operation on each model of the plurality of trained machine learning computer models, using a testing data set and recording performance metric values that result from the model testing, in the database in association with the training data set characteristic information and hyperparameter information for each model;

perform a difference comparison on the training data set characteristic information, hyperparameter information, and the performance metric values associated with each model of the plurality of trained machine learning computer models, to thereby generate a trend data structure that correlates differences in training data set characteristic information and hyperparameter information with differences in performance metric values to thereby specify a trend;

generate a recommendation of a training data set and hyperparameters, based on the trend specified in the trend data structure, for training a new machine learning computer model; and perform the recommended machine learning training operation to generate a new trained machine learning computer model.

6. The apparatus of claim 5, further comprising, for each model of the plurality of trained machine learning computer models, responsive to the model testing operation completing successfully, writing model information, training data set, and hyperparameters into the database with a pre-defined schema, to thereby collect and store the training data set characteristic information and hyperparameter information for the model in the database.

7. The method of claim 1, wherein the training data set characteristic information comprises a difference file that specifies a difference between the training data set and a previous training data set used to train a machine learning computer model.

8. The method of claim 1, wherein the hyperparameter information comprises a setting of at least one of a learning rate or a number of hidden layers in a corresponding trained machine learning computer model.

9. The method of claim 1, wherein the performance metric values comprise at least one of an accuracy score, a prediction metric, a recall metric, or an area under the curve score.

10. The method of claim 1, wherein generating the recommendation comprises analyzing the trend specified in the trend data structure to identify changes in the training data set characteristic information that generate changes in performance metric values that improve one or more of the performance metric values.

11. The method of claim 1, wherein generating the recommendation comprises analyzing a graphical representation of the trend specified in the trend data structure to identify a portion of the graphical representation where the trend is determined to be smooth, and selecting a combination of training data set characteristic information and hyperparameter information corresponding to a point in the identified portion of the graphical representation.

12. The computer program product of claim 3, wherein the training data set characteristic information comprises a difference file that specifies a difference between the training data set and a previous training data set used to train a machine learning computer model.

13. The computer program product of claim 3, wherein the hyperparameter information comprises a setting of at least one of a learning rate or a number of hidden layers in a corresponding trained machine learning computer model.

14. The computer program product of claim 3, wherein the performance metric values comprise at least one of an accuracy score, a prediction metric, a recall metric, or an area under the curve score.

15. The computer program product of claim 3, wherein generating the recommendation comprises analyzing the trend specified in the trend data structure to identify changes in the training data set characteristic information that generate changes in performance metric values that improve one or more of the performance metric values.

16. The computer program product of claim 3, wherein generating the recommendation comprises analyzing a graphical representation of the trend specified in the trend data structure to identify a portion of the graphical representation where the trend is determined to be smooth, and selecting a combination of training data set characteristic information and hyperparameter information corresponding to a point in the identified portion of the graphical representation.

17. The apparatus of claim 5, wherein the training data set characteristic information comprises a difference file that specifies a difference between the training data set and a previous training data set used to train a machine learning computer model.

18. The apparatus of claim 5, wherein the hyperparameter information comprises a setting of at least one of a learning rate or a number of hidden layers in a corresponding trained machine learning computer model, and wherein the performance metric values comprise at least one of an accuracy score, a prediction metric, a recall metric, or an area under the curve score.

19. The apparatus of claim 5, wherein generating the recommendation comprises analyzing the trend specified in the trend data structure to identify changes in the training data set characteristic information that generate changes in performance metric values that improve one or more of the performance metric values.

20. The apparatus of claim 5, wherein generating the recommendation comprises analyzing a graphical representation of the trend specified in the trend data structure to identify a portion of the graphical representation where the trend is determined to be smooth, and selecting a combination of training data set characteristic information and hyperparameter information corresponding to a point in the identified portion of the graphical representation.

* * * * *